United States Patent [19]

Tronvold

[11] 4,047,706
[45] Sept. 13, 1977

[54] TORCH CUTTING SYSTEM WITH AUTOMATED WORK SUPPORT MECHANISM

[75] Inventor: Harlan C. Tronvold, Minneapolis, Minn.

[73] Assignee: Paper, Calmenson & Co., St. Paul, Minn.

[21] Appl. No.: 733,288

[22] Filed: Oct. 18, 1976

[51] Int. Cl.² .......................................... B23K 37/04
[52] U.S. Cl. ........................................ 266/49; 266/65; 83/106; 209/84
[58] Field of Search .............. 83/106; 209/84; 266/49, 266/65

[56] References Cited

U.S. PATENT DOCUMENTS

| | | | |
|---|---|---|---|
| 3,348,680 | 10/1967 | Mathews et al. | 209/84 |
| 3,526,395 | 9/1970 | Brown | 266/49 X |
| 3,545,612 | 12/1970 | Mumma | 209/84 |
| 3,743,260 | 7/1973 | Alleman et al. | 266/49 |

FOREIGN PATENT DOCUMENTS 305,027  1971  U.S.S.R. .................................. 266/65

Primary Examiner—Roy Lake
Assistant Examiner—Paul A. Bell
Attorney, Agent, or Firm—Jacobson and Johnson

[57] ABSTRACT

An apparatus for removing slag during torch cutting of a metal work plate by an oxyacetylene torch which is remotely programmed to cut a predetermined pattern in a metal plate. The molten metal slag particles fall through an upper and lower section of a conveyor belt and onto the floor of a tank filled with water. The lower section of a continuous moving conveyor belt transports the slag along the floor of the tank to a disposal area. The workpiece which is cut from the metal plate drops into the tank but is prevented from falling to the floor of the tank by the top section of the conveyor belt. The top section of the conveyor belt transports the workpiece to a finishing area. Movable and adjustable members are provided for supporting the work plate during the cutting operation.

8 Claims, 12 Drawing Figures

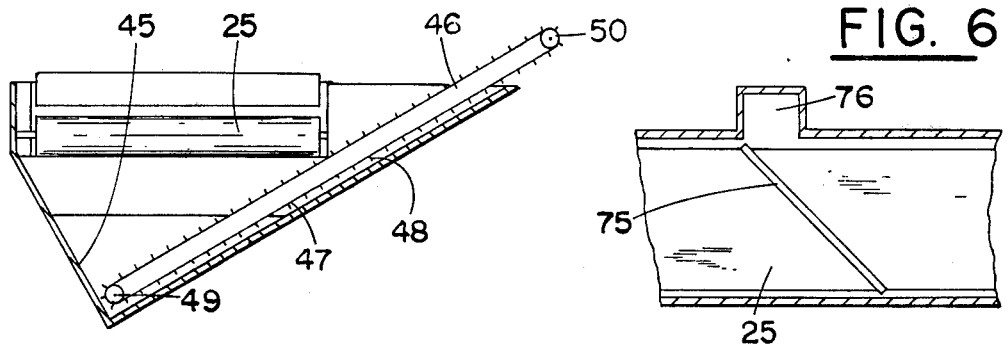
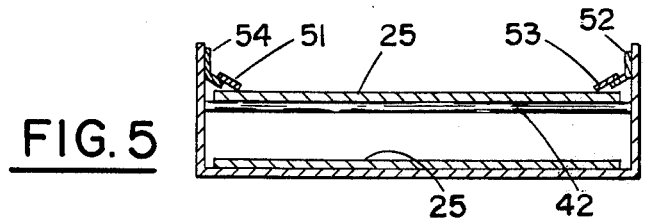
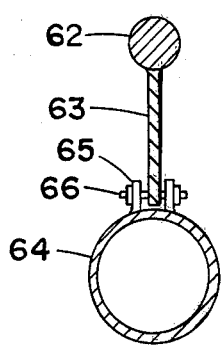
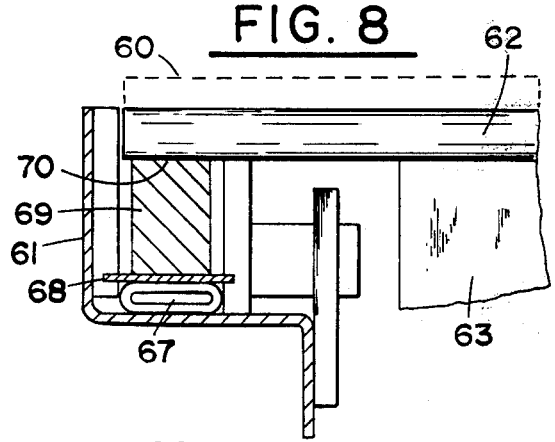
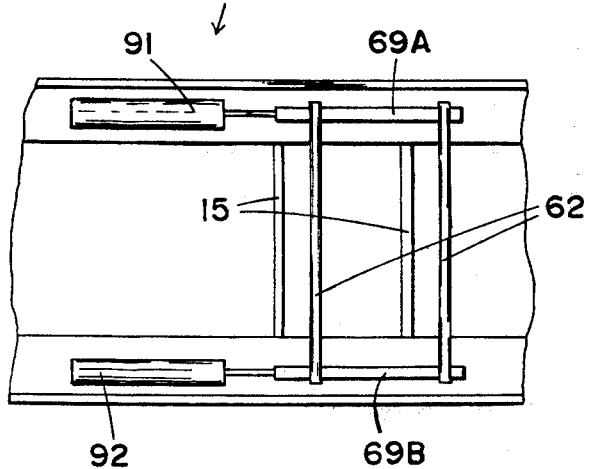

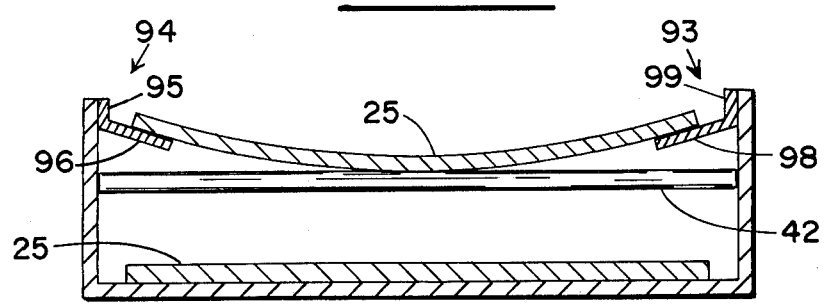

TORCH CUTTING SYSTEM WITH AUTOMATED WORK SUPPORT MECHANISM

BACKGROUND OF THE INVENTION

1. Field of the Invention

This invention relates generally to the field of metal cutting and, more specifically, is an apparatus for handling and transporting both the cut metal workpieces and the molten slag.

2. Description of the Prior Art

Several prior art methods of removing slag during torch cutting operations are known. One of the most common utilizes a number of spaced supports for supporting the metal work plate during the cutting operation. As the torch cuts the workpiece from the work plate, the metal slag falls onto the floor where it is periodically removed by mechanical means. The cut workpiece remains on the supports and is removed by the operator.

Another process is shown and described in the Brown U.S. Pat. No. 3,526,395 in which the metal slag falls onto an inclined plane. Thereafter, a stream of water is directed on the inclined plane to wash the metal slag into a collection area. The present invention differs from the prior art in that it provides a porous conveyor belt that performs a two-fold function, i.e., the top section of the conveyor transports the workpiece to a deburring station where the operator performs the finishing operation on the workpiece. Simultaneously, the lower section of the conveyor belt removes any slag from the water tank by dragging or pushing the metal slag to a collection area located at the end of the tank.

SUMMARY OF THE INVENTION

Briefly, the invention comprises a torch cutting apparatus for cutting a metal plate into an article of the desired shape in which a slag removal and article transporting mechanism are located in a water tank. The article cut from the metal plate drops onto the top section of a porous conveyor belt so that the workpiece is conveyed to one end of the water tank while the molten metal slag falls through the porous conveyor belt and onto the flat bottom of the water tank. The edge surfaces of the links in the conveyor belt push or drag the slag particles to a collection area located at the other end of the tank. An apparatus is also included for automatically adjusting the spacing of the supports for different articles.

BRIEF DESCRIPTION OF THE DRAWING

FIG. 4 is an end section view of the elevating mechanism for removing slag;

FIG. 5 is a cross-sectional view of the conveyor belt and tank;

FIG. 6 is a secondary scrap piece collection mechanism;

FIG. 8 shows an automated workpiece support bar for use in the invention;

FIG. 10 is a top view of the adjustable workpiece support mechanism;

FIG. 11 is a cross-sectional view of the support bar; and

FIG. 12 is a cross-sectional view of the conveyor belt and the preferred edge supports for the conveyor belt.

DESCRIPTION OF THE PREFERRED EMBODIMENT

Figure 1:
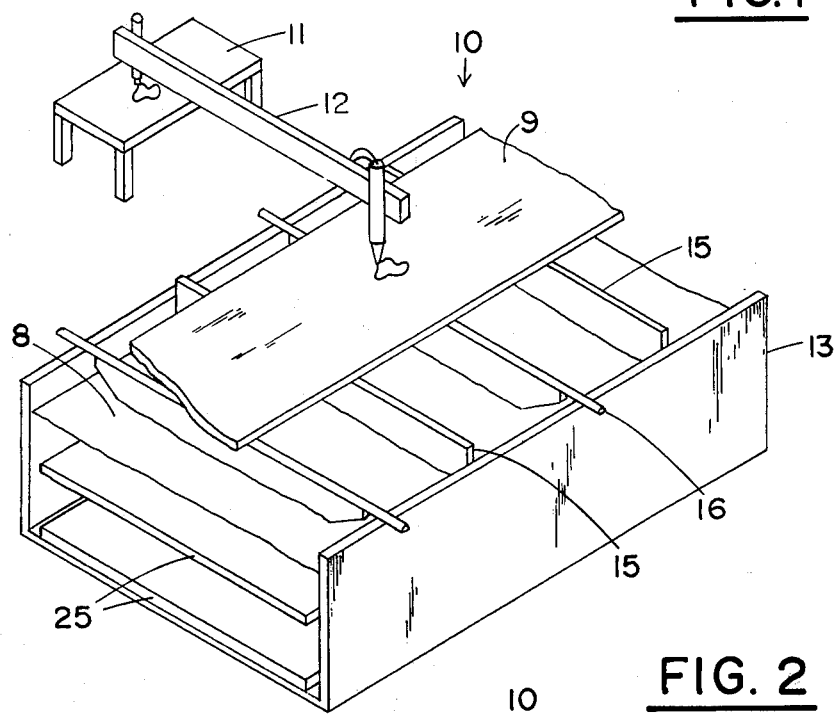
FIG. 1 is a partial view of a flat work sheet supported on top of the water tank of the present invention.

Referring to FIG. 1, reference numeral 10 designates the water tank and reference numeral 11 designates a work table or pattern layout table. Reference numeral 12 designates in semi-schematic form, a torch and the equipment that guides the torch along its cutting path. Both the torch and torch programming equipment are well known in the art and will not be described herein. The torch is shown cutting an article from a flat sheet of material 9 which is supported on a set of permanent support members 15 and a set of adjustable support members 16 which are movable laterally along tank 13. The water level in water tank 10 is designated by reference numeral 8 and a conveyor belt which runs in the water is designated by reference numeral 25.

Figure 2:
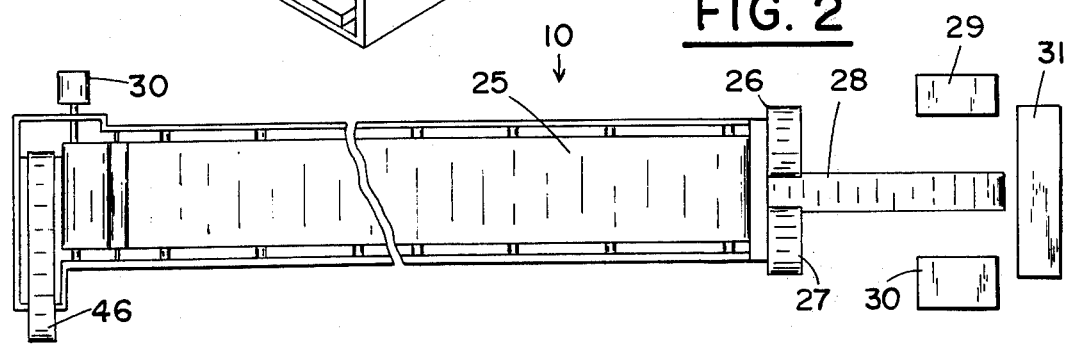
FIG. 2 is a top view of the invention.
Figure 3:
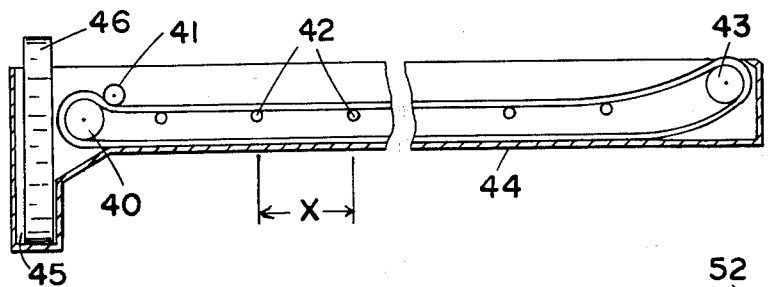
FIG. 3 is a side view of the invention.

FIGS. 2 and 3, respectively, show a top view and a side view of the invention on which the permanent and adjustable support members for the work plate have been left out for clarity. A motor 30 for propelling conveyor belt 25 is located at one end of tank 10. A rubber lagged drive roll 40 and a stub snubbing roll 41 provide tension in the bottom section of conveyor belt 25. An idler roll 43 is placed at a high elevation so that the parts can be raised at the exit end of tank 10 and be deposited on conveyors 27 and 28. A set of end conveyors 26, 27 and 28 are located at one end of tank 10. Conveyors 26 and 27 travel inwardly toward conveyor 28. Third conveyor 28 transports workpiece away from conveyors 26 and 27 to work table or finishing area 31. Located adjacent to work table 31 are a pair of deburring stations 29 and 30, where an operator removes flash or sharp edges on the cut workpieces.

A further conveyor 46 is located at the opposite end of tank 10 in a recess region 45 of tank 10. The metallic slag is deposited in recess region 45 by conveyor 25 and therefrom elevated onto a receiving container by conveyor 46.

Referring to conveyor 25, as shown in FIG. 3, one sees the top section of conveyor belt 25 is supported at intermediate positions by rollers 42, which are spaced apart a distance denoted by X. However, spacing also depends on the type of material used in the belt as well as the number of links in the belt. Typically, with pivot links on the order of every 2, X may range from 3 to 7 feet but 5 feet is preferred.

The bottom of tank 10 is designated by reference numeral 44 and comprises a flat surface in which the lower section of conveyor belt 25 drags the metal slag to recess region 45 in tank 10.

Figure 7:
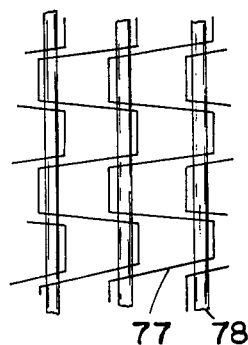
FIG. 7 is an enlarged view of the conveyor belt used with the present invention.

In order to understand the function and operation of conveyor belt 25, reference should be made to FIG. 7, which shows a top view of a section of conveyor belt 25 comprised of a set of zigzag U-shaped sections 77 having a pivot rod 78 pivotally connecting each section. Pivot rods 78 make conveyor belt 25 flexible yet supportively strong so the belt 25 can pass around rollers 43 and 40 and still support heavy workpieces. The purposes of the large opening in belt 25 is to allow the slag particles to fall through the conveyor belt and onto the bottom of water tank 10. The main portion of conveyor belt 25, sections 77, are perpendicular to the bottom of water tank 10 to enable sections 77 to drag or scrape the bottom of tank 10. This scraping or dragging action of sections 77 pushes the slag particles to the end of tank 10 where they are deposited in recess region 45. Conveyor 46 elevates the slag particles from recess region area to a disposal container.

Figure 9:
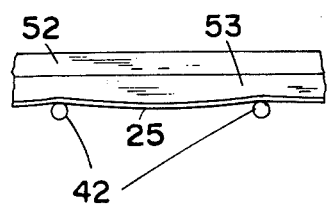
FIG. 9 shows the top section of the conveyor belt and its support.

FIG. 9 illustrates in detail side deflector members 53 and 52 and how conveyor belt 25 is suspended between rollers 40 and 42. Because of the weight of the conveyor belt 25 and the gravitational forces, there is a natural sagging of the belt 25 between rollers. In order to compensate for this sag and prevent cut articles which drop onto the conveyor belt from sliding off the side of the conveyor belt 25, there are provided (see also FIG. 5) a pair of side deflectors 52 and 54 on each side of tank 10. Attached to deflectors 54 and 52 are respectively flexible members 51 and 53 which follow the contour of the conveyor belt 25 as illustrated in FIG. 9. These deflectors direct the cut articles onto the center of the conveyor belt where the articles are carried to the end conveyors 26, 27 or 28. These deflectors insure that under normal circumstances, any cut article will stay on the top section of the conveyor belt. In the event an article should happen to slip between the conveyor belt 25 and side deflectors 51 or 53, the article would fall on top of the lower section of conveyor belt 25. The lower section of conveyor belt 25 would transport the work article along the bottom section of conveyor belt 25 into a pocket 76 where it can be removed by an operator. This eliminates the possibility of a cut article becoming engaged in the support and drive rollers (FIG. 6)

Reference to FIG. 4 shows main conveyor belt 25 pushing the slag into chamber 45 in which there is located an elevating mechanism 46 having a belt 47 supported by rollers 49 and 50. A set of members 48 are located on belt 46 for elevating the slag particles to a disposal site.

One problem in cutting articles from a stock sheet of material is that for most articles it is necessary to support the article in at least two places during the cutting operation. If the article is supported in only one place, the combination of the weight of the article and the heat of cutting is usually sufficient to allow the article to bend downward, thus producing an untrue cut. FIG. 1 shows the permanent support member 15 and adjustable support members 16 which are manually adjustable to support the workpiece in at least two positions.

In order to provide a mechanism for automatically controlling the spacing of the adjustable spacer bars with respect to the size of a workpiece to be cut, there is provided the mechanism shown in detail in FIGS. 8, 10 and 11. The adjustable support member is shown in cross section in FIG. 11 and comprises a solid workpiece support rod 62, a rectangular member 63, a hollow member 64 having member 65 thereon for connecting to plate 63 through pins or bolts 66. This mechanism provides both stability and a nonsagging support. While support rod 62 is shown as circular, it could have other geometric shapes, such as rectangular or be an extension of member 63 rather than a separate piece.

Referring to FIG. 8, there is shown an end support bar 69A having a recess 70 therein. Tank 10 has been formed outward at the top and has an L-shape 61. Located at the bottom of bar 69A is a stainless steel slide plate 68 and a pressure hose 67 which can be expanded with air pressure, hydraulic pressure or the like. Expansion of hose 67 raises member 69A as well as the member 62 which is attached thereto, to the position indicated by dotted lines 60 in FIG. 8. This allows adjustable member 62 to be brought in contact with the article to be cut and in the same plane as the permanent support members 15. Located on the opposite end of tank 10 is a similar end support bar and associated mechanism which will not be described herein except to state that a common pressure source would be used to expand the hoses on each side of tank 10.

When bar 62 is in the lower position, one can position support bar 62 under the workpiece by the mechanism 90 shown in FIG. 10. Mechanism 90 comprises a pair of pressure cylinders 91 and 92 which are mounted to tank 10 and connected to end support bars 69A and 69B. Pivotally supported in end support members 69A and 69B is previously described support member 62. By controlling the pressure to pressure cylinders 91 and 92, one can space support members 62 laterally with respect to permanent support members 15. Thus, one can automatically control the spacing for supporting the articles by controlling the pressure supplied to cylinders 91 and 92.

Referring to FIG. 12, the preferred embodiment of said deflectors are designated by reference numerals 93 and 94. Deflector 93 comprises a rigid flat section 98 that extends partially under and along belt 25 and a vertical section 99 that fastens to tank 10. Similarly, deflector 94 comprises a rigid flat section 96 that extends partially under and along belt 25 and a vertical section 95 that fastens to tank 10. These deflectors hold the ends of conveyor belt 25 above the ends of roller 42, thus allowing article to roll or slide to the center of conveyor 25. This also makes it difficult for any articles to slide between the edges of conveyor 25 and deflectors 93 or 94.

I claim:
1. An apparatus for removing slag from a torch cutting operation comprising:
   a torch for cutting a sheet of metal into a predetermined shape;
   a water tank suitable for filling with water;
   a plurality of support members for supporting the sheet of metal above said tank;
   a porous conveyor located in said tank, said conveyor having openings of sufficient size to allow slag to fall therethrough but sufficiently small to prevent the article cut from the sheet of metal from falling therethrough, said conveyor operable for transporting the article to a finishing area and for transporting slag to a collection area located in said tank, and means for propelling said conveyor.
2. The invention of claim 1 wherein said tank includes a plurality of adjustable work support members.
3. The invention of claim 1 wherein said tank includes a mechanism for removing slag from said tank.
4. The invention of claim 1 wherein said tank includes deflectors for directing articles onto the center of said conveyor.
5. The invention of claim 4 wherein said tank includes a collection area for articles that slide off the edge of the conveyor and a doctor bar for directing articles onto the collection area.
6. The invention of claim 1 wherein said supporting members include means for adjusting the lateral spacing of said support bar.
7. The invention of claim 6 wherein said means comprises pressure members for displacing said support bars.
8. The invention of claim 7 wherein said means further includes pressure members for elevating said support bar to a predetermined position to thereby support the article during the torch cutting operation.

* * * * *